Figure 1:
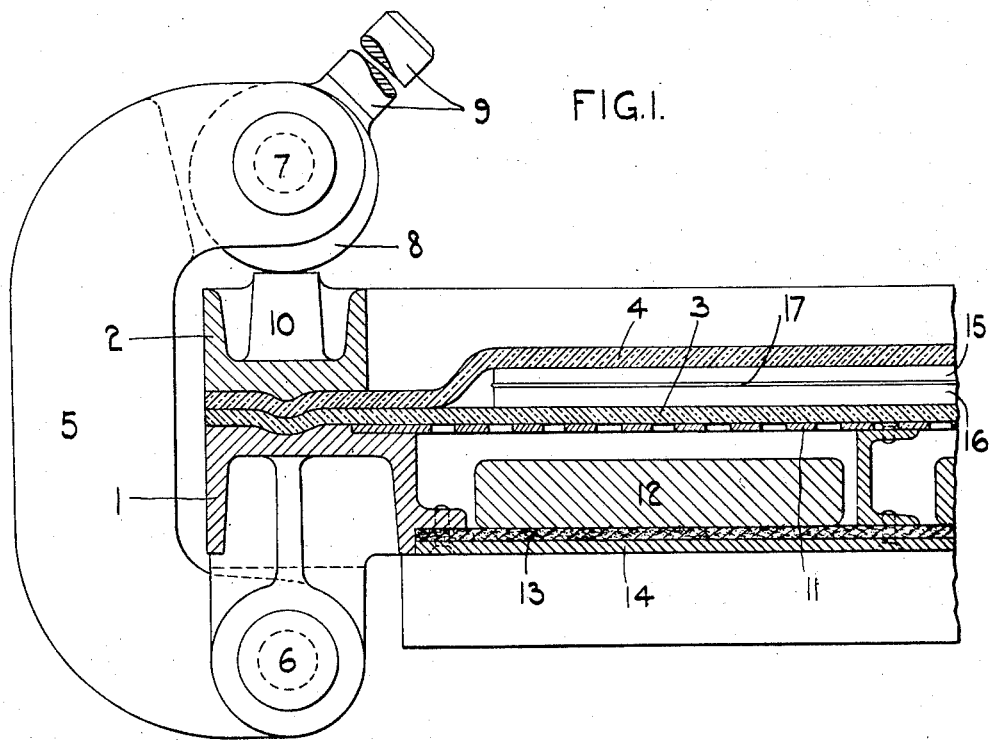

Nov. 25, 1930.  J. JEFFRAY  1,782,852
MANUFACTURE OF SPLINTERLESS GLASS
Filed Dec. 4, 1929  2 Sheets-Sheet 1

Nov. 25, 1930.  J. JEFFRAY  1,782,852
MANUFACTURE OF SPLINTERLESS GLASS
Filed Dec. 4, 1929  2 Sheets-Sheet 2

Patented Nov. 25, 1930

1,782,852

UNITED STATES PATENT OFFICE

JOHN JEFFRAY, OF EALING, LONDON, ENGLAND

MANUFACTURE OF SPLINTERLESS GLASS

Application filed December 4, 1929, Serial No. 411,442, and in Great Britain November 12, 1928.

This invention relates to the manufacture of non-splintering glass sheets, namely glass sheets composed of sheets of glass united together by an interposed film.

According to a known process of manufacture glass plates with an interposed film of cellulose acetate or the like are held together by clamps, enclosed in a fluid-tight bag of india-rubber, and subjected to heat and fluid pressure in an autoclave, the interior of the india-rubber bag being subjected to suction in order to rarefy the air either prior to or during the initial heating. The pressure employed is considerable, and ranges between 35 lbs. to 2½ tons per square inch above atmospheric pressure.

The present invention consists essentially in entirely dispensing with artificial pressure in the manufacture of splinterless glass.

According to the invention the glass sheets are united effectively by an interlayer and an appropriate transparent cement by means of atmospheric pressure alone whilst subjected to the heat necessary to maintain the interlayer and cement in condition to function.

In manufacturing according to the present invention it is therefore entirely unnecessary to employ high pressures for marrying the glass sheets to the interlayer. The pressure of the atmosphere is ample and indeed ideal for the purpose in question.

It will be appreciated that there are numerous advantages gained by dispensing with the use of high pressures apart from the saving in cost and liability of wastage due to breaking of the glass when subjected to high pressure. For example, with the relatively low pressure of the atmosphere there is not any molecular disturbance of the interlayer and cement such as is bound to be the case when high pressures are employed, and whereas when high pressures are employed there is an internal molecular reaction in the interlayer and cement when the pressure is released that tends to separate the sheets; in manufacturing according to the present invention there is not any such reaction.

In carrying out the process according to the invention the sheets with the interposed layer and cement are placed in a chamber which is then closed in an air-tight manner and the air withdrawn therefrom, the said chamber comprising a wall or diaphragm of rubber or other appropriate air-proof material so arranged as to be forced by the external atmospheric pressure upon the glass sheets within the chamber upon the evacuation of the air therefrom. When released from said chamber the atmospheric pressure to which the sheets are subjected is substantially the same as that to which they were subjected when enclosed within the chamber consequently there is not any reaction tending to separate them whereas, when assembled glass sheets are released from the stupendous pressure of a power press, there is such an enormous contrast between that and the atmospheric pressure that the cement and interlayer automatically tend to expand and recover their original volume.

The apparatus employed in manufacturing splinterless glass according to the invention comprises a container having walls formed as flexible diaphragms, say of rubber or balata, between which the sheets of glass and interlayer are placed. After effectively closing the container in an air-tight manner a vacuum is applied which has the effect of not only withdrawing the air and causing the flexible diaphragms to collapse and force the glass sheets together, but also of effectively vaporizing and withdrawing the residual gases and liquids; at the same time drying the edges between the glass. In using a flexible diaphragm instead of a rigid metal platen uniform evenly distributed pressure becomes possible whatever the contour or unevenness of the glass may be without unduly concentrating a great force on any particular convexity which inevitably leads to fracture of the glass and is the main cause of the great percentage of breakages experienced in the manufacture of splinterless glass in the heretofore usual manner.

Figure 2:
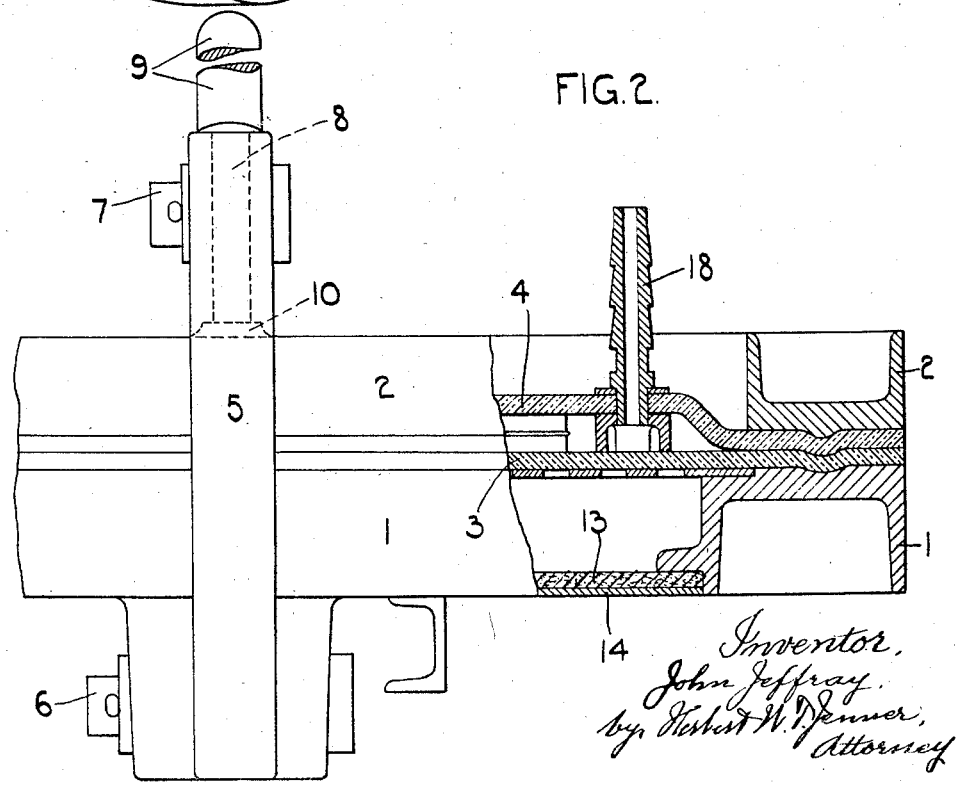

Figs. 1 and 2 of the drawings show in sectional elevations apparatus embodying the invention suitable for use in the manufacture of flat sheets of splinterless glass.

Figure 3:
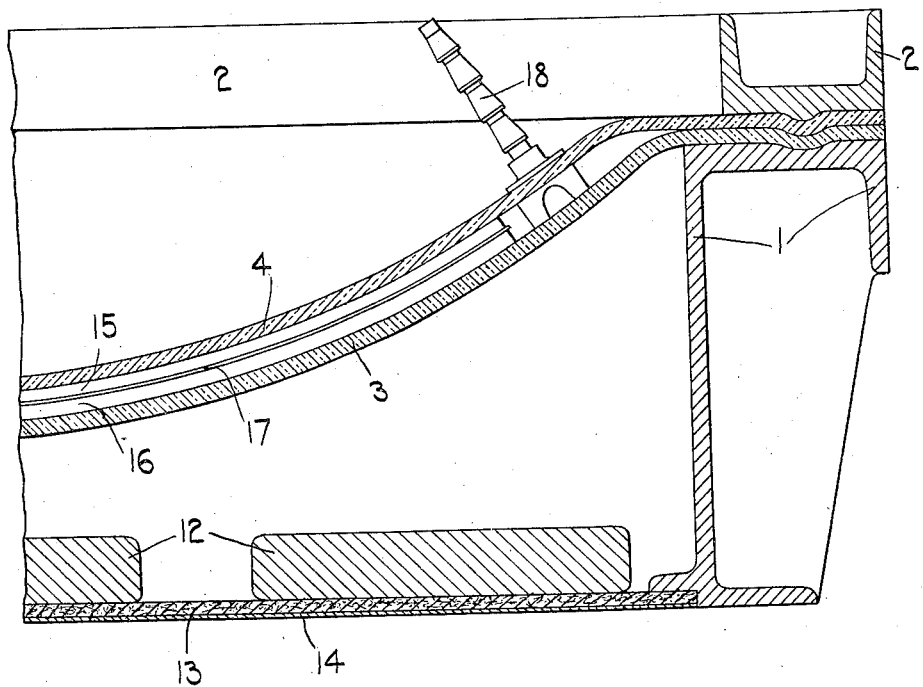

Fig. 3 is a similar view to Fig. 1 showing apparatus according to the invention suitable for use in making curved sheets of splinterless glass.

In the apparatus or vacuum pressing device shown in Figs. 1 and 2, 1 indicates a lower metal frame and 2 an upper metal frame. These frames are of rectangular or any other desired shape and of any size according to the dimensions of the sheets of glass to be united. 3 and 4 are diaphragms of india-rubber or other appropriate material the marginal portions of which are adapted to be gripped between the frames 1 and 2 which are arranged to be forced towards one another by any suitable clamping means. In the example shown the clamps each consist of a saddle-shaped bar 5 pivoted at 6 to lugs downwardly depending from the lower frame 1, the free end of said bar carrying a pin 7 on which is mounted a cam 8 that is formed in one piece with a handle 9. The cam 8 is adapted to bear on a seat 10 cast in one piece with the upper frame 2. It will be understood that there are any desired number of these clamps arranged at suitable intervals around the frames 1 and 2 and that by manipulation of the handles 9 the cams 8 press the frames 1 and 2 towards each other with sufficient force to firmly grip the marginal portions of the diaphragms 3 and 4 and form an effective air-tight joint between them.

The lower diaphragm 3 is supported by a perforated metal sheet 11 carried by the lower frame 1 and below the said perforated sheet, electric or other suitable heating elements 12 may if desired be arranged within the frame 1 resting on a sheet of asbestos 13 that covers a plate 14 fixed to the bottom of the lower frame 1.

The space between the diaphragms 3 and 4 constitutes a casing adapted to receive the glass sheets 15 and 16 which are to be united by means of the interposed film 17. When the sheets have been placed in position and the clamps actuated to press the frames 1 and 2 together, air is withdrawn from between the diaphragms by a suitable vacuum pump connected to the nipple 18.

The construction of the apparatus shown in Fig. 3, for use in manufacturing curved sheets of splinterless glass, can be clearly understood without further description as corresponding parts are indicated by corresponding reference numbers.

A further outstanding advantage of the apparatus is that, whereas with a power press the limit of size of splinterless or safety glass to be produced is confined to the dimensions of the press platen which itself is limited, there is no limit to the size of glass that can be assembled in the pneumatic press constituted by the container with flexible diaphragms which, if desired, can be made of a size suitable for manufacturing large shop windows.

In order to enable the correct degree of heat to be obtained during the uniting process and according to the nature of the interlayer and cement any appropriate heating means may be employed. With advantage the heat may be obtained electrically by the arrangement of a suitable resistance unit or units below or in proximity to the container in which the glass sheets are located.

Conveniently, the container hereinbefore described or a number of such containers adapted to be connected to an air pump or a vacuum chamber, may be suitably supported in an electrically heated oven the interior of which is in free communication with the atmosphere.

The uniformity of the pressure applied to the glass sheets in the simple manner described, and the way in which the flexible walls or diaphragms adapt themselves to the contour of the glass surface consequent upon the removal of all air from the chamber, results in the production of splinterless glass of dimensions hitherto unattained at a remarkably low cost and with far less liability of breakage in the process of manufacture than in any methods heretofore employed in the production of this kind of glass.

The flexibility of the diaphragms enables curved sheets of glass to be united with the same efficiency as simple plain sheets of glass.

What I claim is:—

Apparatus for manufacturing splinterless glass, comprising an air-tight chamber for holding two sheets of glass and an interposed layer of suitable adhesive material, said chamber having collapsible upper and lower sides, a perforated plate secured under the lower side of the chamber, a compartment arranged below the perforated plate, heating devices inclosed in the said compartment and adapted to render the interposed layer adequately adhesive, and means for exhausting the air from the chamber to collapse its walls upon the sheets of glass and thereby effect the complete and permanent union of the sheets of glass at a pressure not exceeding that of the atmosphere.

In testimony whereof I affix my signature

JOHN JEFFRAY.